Jan. 20, 1970   A. F. READER ET AL   3,490,405
METHOD AND APPARATUS FOR MAKING CURVED REFLECTORS
Filed Aug. 23, 1967   3 Sheets-Sheet 1

INVENTORS
AUSTIN F. READER
WALTER E. RUSSELL
EDWARD A. WERNER

BY

ATTORNEYS

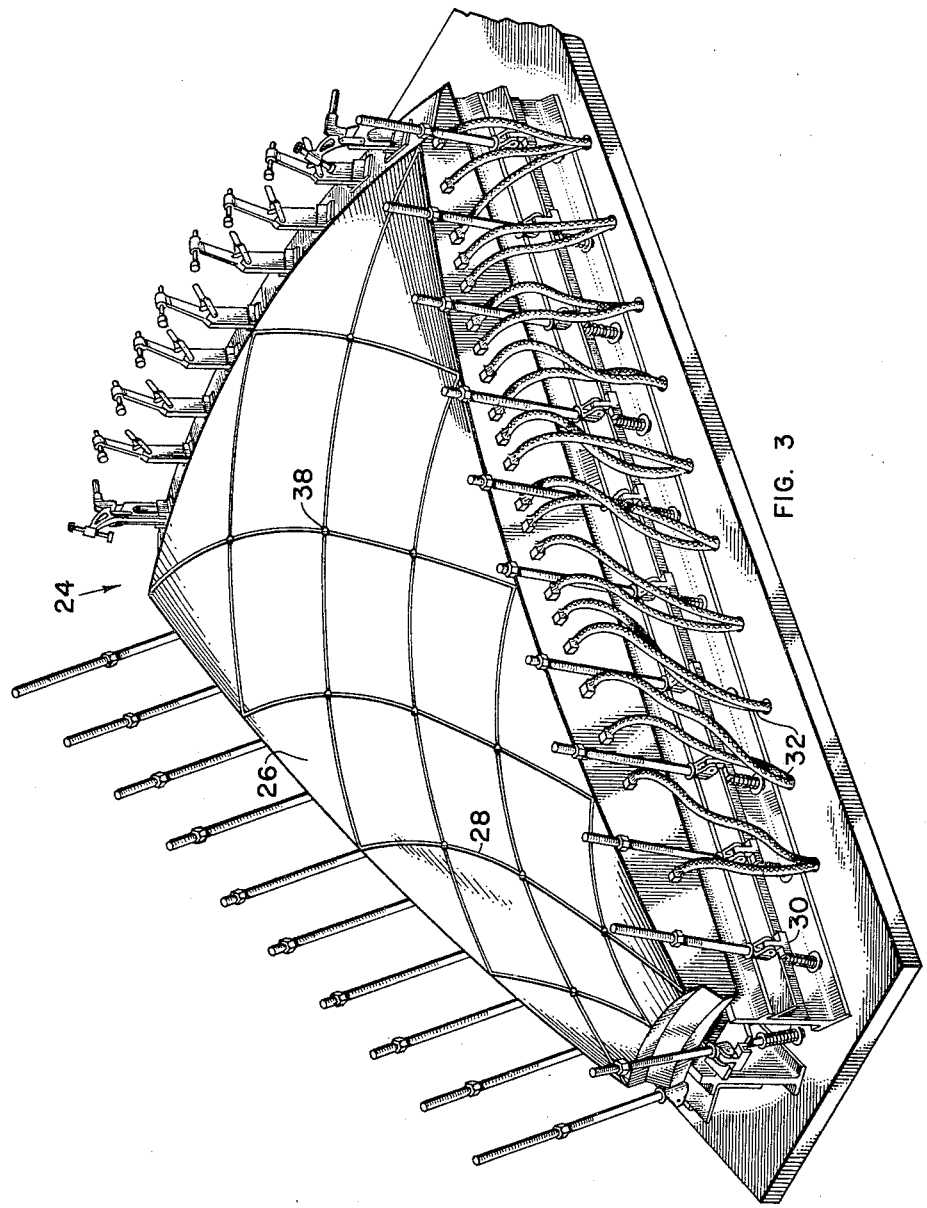

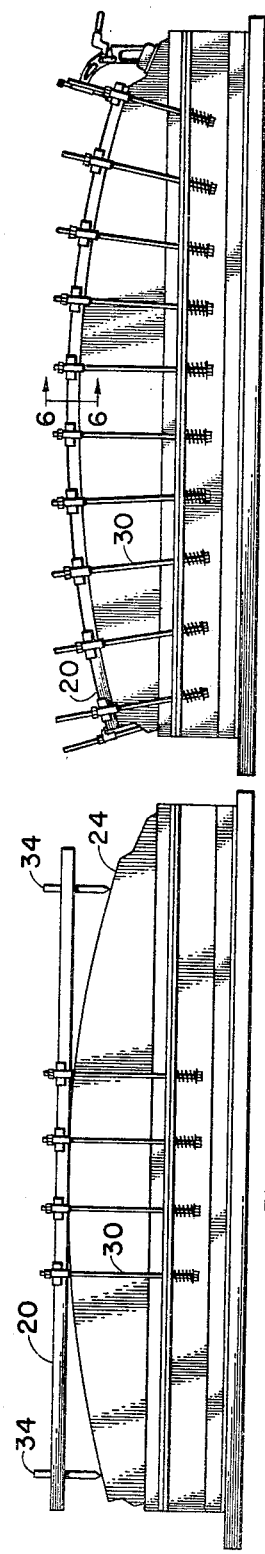
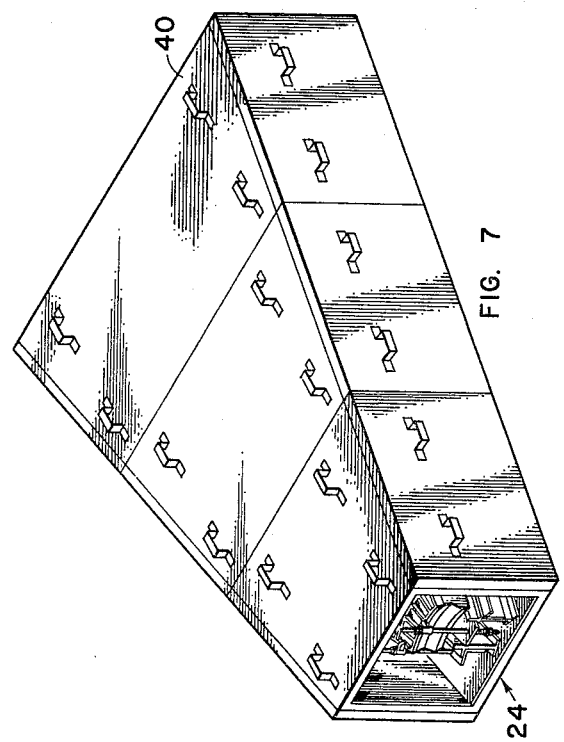
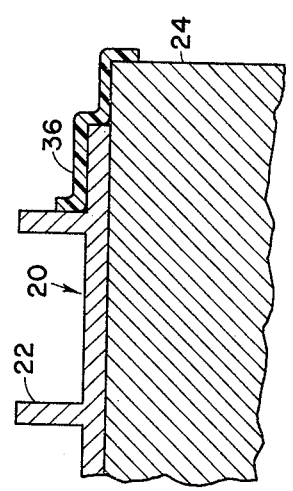
INVENTORS
AUSTIN F. READER
WALTER E. RUSSELL
EDWARD A. WERNER
ATTORNEYS

United States Patent Office 3,490,405
Patented Jan. 20, 1970

3,490,405
METHOD AND APPARATUS FOR MAKING CURVED REFLECTORS
Austin F. Reader, Brunswick, Walter E. Russell, Lorain, and Edward A. Werner, Parma, Ohio, assignors to the United States of America as represented by the Administrator of the National Aeronautics and Space Administration
Filed Aug. 23, 1967, Ser. No. 662,829
Int. Cl. B21d 51/04, 51/10, 31/06, 35/00
U.S. Cl. 113—116                                  8 Claims

ABSTRACT OF THE DISCLOSURE

Fabricating and forming each curved segment of a light weight mirror by polishing one surface of a flat magnesium plate and then machining stiffening ribs in the other side. Each plate is accurately formed on a single mold with the application of heat and pressure after the machining.

---

The invention described herein was made by employees of the United States Government and may be manufactured and used by or for the Government for governmental purposes without the payment of any royalties thereon or therefor.

This invention is concerned with making a curved reflector a thin cross section. More particularly, the invention relates to a method of fabricating and forming segments of a solar mirror having compound curves in which the reflecting surface is polished prior to any machining of the opposite surface.

A problem encountered in space flight is that of providing the craft with sufficient electrical power. One approach to solving this problem is the utilization of a Brayton cycle system in which the sun's heat is supplied to a boiler or heat receiver from a large diameter solar mirror. The mirror should have an accurate reflecting surface so that as much solar heat as possible can be collected and channeled into the system. Such a mirror is quite large and is made up of sections. The weight of such a mirror must be kept to a minimum.

The fabrication of the large compound curved surfaces for these mirrors presents difficult problems. Conventional manufacturing techniques have not been satisfactory for producing rigid, lightweight sectors to the dimensional and surface accuracy required. Such accuracy with stability requires a smooth continuous reflecting surface supported by an integral stiffening structure. The weight limitation placed on such mirrors necessitate structures having thin cross sections.

The fabrication problems have been solved by producing reflector segments in accordance with the present invention. Polishing of the reflective surface is performed prior to any machining. Each mirror segment is then machined and formed to the proper configuration on a mold by utilizing heat and pressure.

It is, therefore, an object of the present invention to provide an efficient method and apparatus for producing lightweight reflectors having high quality reflecting surfaces.

Another object of the invention is to provide a method and apparatus for producing large reflectors having high reflectivity in which all polishing of the reflective surface is performed prior to any machining and forming.

These and other objects of the invention will be apparent from the specification which follows and from the drawings wherein like numerals are used throughout to identify like parts.

In the drawings:

FIG. 3 is a perspective view of a forming mold utilized in the method of the invention;

FIG. 4 is an elevation view showing the start of the forming and shaping of a mirror section;

FIG. 5 is an elevation view showing a later stage in the forming and shaping operation;

FIG. 6 is an enlarged section view taken along the line 6—6 in FIG. 5; and

FIG. 7 is an elevation view showing the final heating operation.

Figure 1:
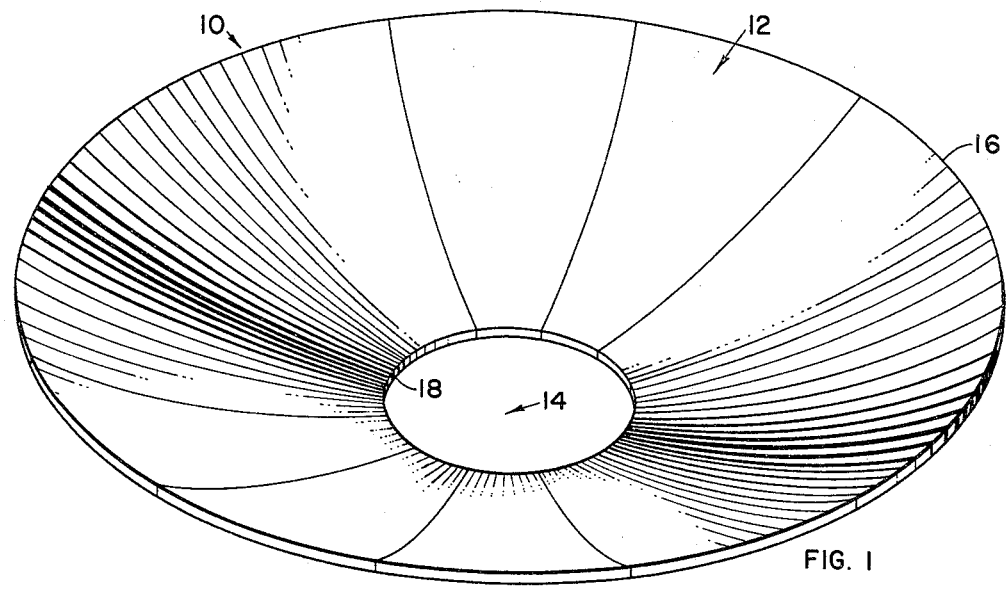
FIG. 1 is a perspective view of a rigid solar mirror constructed in accordance with the present invention.

Referring now to the drawings, there is shown in FIG. 1 a rigid solar mirror 10 in the form of a shallow bowl that is constructed in accordance with the present invention. The mirror 10 is circular in shape and has a reflecting inner surface 12. A centrally disposed opening 14 receives a solar generator. The reflecting surface 12 extends between an outer peripheral edge 16 of the mirror 10 and an inner edge 18 about the circular opening 14. The surface 12 is in the form of a paraboloid for properly focusing the sun's rays at the heat receiver for the generator in the opening 14.

Solar mirrors are quite large. By way of example, a Brayton cycle system will utilize a solar mirror having a diameter of 20 feet to generate 3 to 4 kilowatts of electrical power. A similar mirror 30 feet in diameter will provide 8 to 10 kilowatts of electrical power in such a system.

Figure 2:
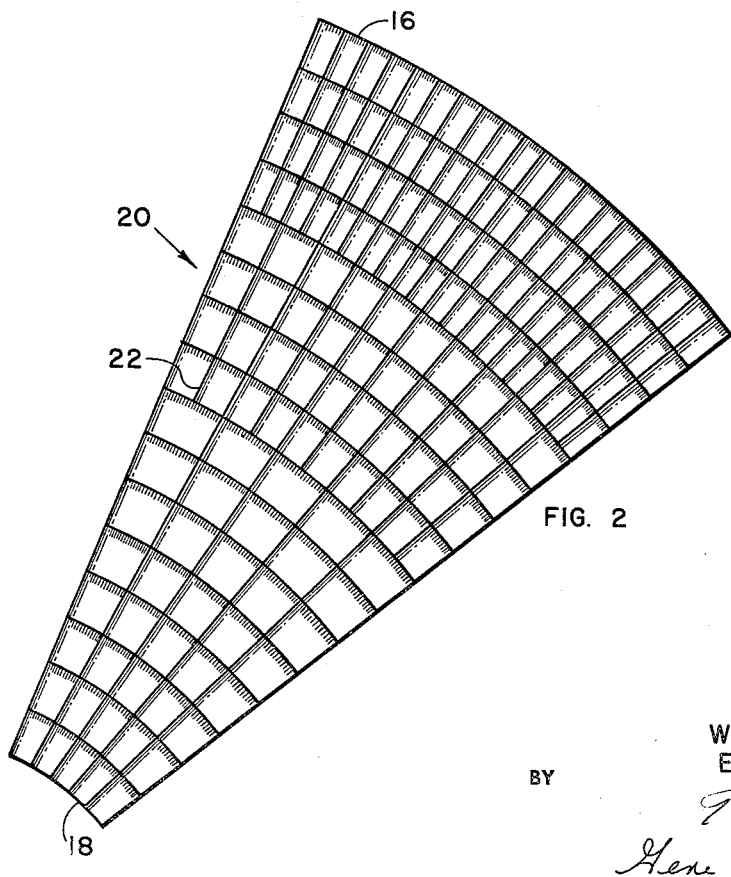
FIG. 2 is a plan view of one section of the solar mirror shown in FIG. 1 illustrating the reinforcement on the back side.

Because of their large sizes, solar mirrors are made in separate sections 20 such as shown in FIG. 2. These sections 20 are subsequently assembled into a mirror 10 shown in FIG. 1. A twenty-foot-diameter mirror 10 has been constructed in accordance with the invention by utilizing twelve identical sections 20 that are bolted together.

The under side of the mirror 10 opposite the reflecting surface 12 is ribbed for strength and rigidity as shown in FIG. 2. Ribs 22 in the form of deep rectangular grids are used to achieve maximum weight reduction. The reflecting surface has a thickness of about 0.050 inch, and the rib height tapers from 0.62 inch adjacent the edge 18 of the opening 14 to 1.00 inch at the outer edge 16.

Referring to FIG. 3 there is shown a paraboloidal shaped mold 24 used to form the sections 20 of the mirror 10. The mold 24 is of aluminum and has a highly polished forming surface 26 for engaging the mirror sections and forming the reflecting surfaces 12. Grooves 28 in the surface 26 aid in this forming process in a manner which will be described later in greater detail. Clamps 30 positioned about the mold 24 are used to draw the peripheral edge portions of the reflecting surface 12 into contact with the forming surface 26 when a mirror section is heated. Electric heaters within the convex mold 24 are connected to a suitable power source by leads 32.

According to the invention, each mirror section is machined from a flat magnesium plate having a highly polished surface. The machined plate is then formed into the required paraboloidal shape on the mold 24.

The flat plate is first contoured to the outline of the section shown in FIG. 2. Then one surface of the flat plate is polished to a high finish. The ribs 22 shown in FIG. 2 are formed on the reverse side by milling out metal in predetermined areas after the opposite surface has been polished. Each central rib has a uniform thickness of about 0.075 inch while the outer circumferential rib is about 0.75 inch thick and has a thirty-degree tilt to form a bolting base for the rim of the mirror 10.

After the ribs have been machined on the back surface of the magnesium plate, the flat segment is placed on the mold 24 as shown in FIG. 4. Clamps 30 engage peripheral edge portions of the machined plate for proper positioning.

Current is passed through heaters within the mold 24 from the leads 32 thereby heating both the mold and plate to an elevated temperature at which magnesium starts to soften. The mold 24 typically contains about 80 kilowatts of resistance heaters. The mold 24 is heated to about 400° F, and the clamps 30 are tightened as the edges of the machined plate bends into contact with the surface of the mold as shown in FIG. 5. Pins 34 extending outward from the forming surface 26 pass through openings in the section 20 and guide the surface 12 into proper engagement with the forming surface.

The section edge to mold joint is then sealed with high temperature silicon adhesive tape 36 about the entire periphery. A vacuum is established in the space between the surface 12 of the mirror section 20 and the forming surface 26 of the mold 24 to bring these surfaces into intimate contact. The creation of this vacuum is facilitated by the grooves 28 which are in communication with passages 38 that extend through the mold 24 to a suitable vacuum pump.

After the section 20 has been drawn into contact with the mold 24, both are heated to approximately 550° F. This heating is facilitated by surrounding the mold and reflector section with heat shields 40 to form an oven as shown in FIG. 7. This temperature is maintained for about one hour as atmospheric pressure forces the mirror section to conform to the surface of the mold 24.

This assembly is slowly cooled to approximately 200° F., and the vacuum is then released. The mirror section is removed from the mold 24 for subsequent machining.

Edge machining and bolt hole drilling is done on a vacuum machining fixture which is identical with the mold 24 except no heaters are required. Accurate hole drilling is accomplished by positioning two adjacent sections on the machining fixture and drilling body fit bolt holes. The mirror sections are rigidly held on the machining fixture by vacuum in the same manner as the sections are held on shaping mold 24. The sections are then individually cleaned, epoxy coated, and aluminized for high reflectivity prior to final assembly.

While a preferred embodiment of the invention has been shown and described, it will be appreciated that various modifications may be made to the disclosed method and apparatus without departing from the spirit of the invention or the scope of the subjoined claims.

What is claimed is:

1. A method of making a reflector having a reflecting surface with a compound curvature comprising the steps of
   polishing one surface of a flat plate to a final surface finish,
   machining stiffening ribs on the opposite surface of said flat plate,
   heating said plate to the softening temperature,
   bending said heated plate into peripheral contact with a mold having a forming surface facing said one surface on said plate, said forming surface having the compound curvature to which the reflecting surface is to be curved,
   evacuating the space between said forming surface and said polished reflecting surface whereby said plate is forced into contact with said mold, and
   heating said mold and formed plate to an elevated temperature to stress relieve the plate while the same is forced into contact with said mold.

2. A method of making a curved reflector as claimed in claim 1 including the steps of
   polishing a flat magnesium plate,
   heating the mold to an elevated temperature of about 400° F. while guiding the marginal peripheral edges of the magnesium plate into contact with the mold.

3. A method of making a curved reflector as claimed in claim 2 including the step of heating the mold and magnesium reflector to a temperature of about 550° F. for about one hour subsequent to forming the reflecting surface to the configuration of the forming surface.

4. A method of making a curved reflector as claimed in claim 3 including the step of enclosing the mold and magnesium reflector while heating the same.

5. A method of making a curved reflector as claimed in claim 4 including the step of cooling the mold and magnesium reflector to about 200° F. prior to releasing the vacuum.

6. A method of making a curved reflector as claimed in claim 1 including the step of sealing the marginal peripheral edge of the plate and the adjacent surface of the forming mold after the heated plate is bent into peripheral contact with said mold and prior to evacuating the space therebetween.

7. A method of making a reflector as claimed in claim 1 including the steps of
   forming a plurality of plates on the same mold, and assembling said formed plates into a reflector.

8. A method of making a reflector as claimed in claim 7 including the steps of
   machining the edges of each of said formed plates while positioned and held by vacuum on a fixture having a surface identical with the forming surface of said mold.

References Cited

UNITED STATES PATENTS

| 2,858,603 | 11/1958 | Herrmann | 113—116 |
| 3,067,507 | 12/1962 | Titus | 29—475 |
| 3,342,049 | 9/1967 | Devine | 72—364 |

RICHARD J. HERBST, Primary Examiner

U.S. Cl. X.R.
29—428; 72—364